US 9,825,567 B2

(12) United States Patent
Furlan et al.

(10) Patent No.: US 9,825,567 B2
(45) Date of Patent: Nov. 21, 2017

(54) CONTROLLER FOR DRIVING A STEPPER MOTOR

(71) Applicant: Johnson Electric S.A., Murten (CH)

(72) Inventors: Miha Furlan, Bern (CH); Yvan Bourqui, Corminboeuf (CN); Maxime Bruelhart, Kleinboesingen (CH)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/705,378

(22) Filed: May 6, 2015

(65) Prior Publication Data
US 2015/0326158 A1 Nov. 12, 2015

(30) Foreign Application Priority Data
May 6, 2014 (GB) .................... 1407953.7

(51) Int. Cl.
| G05B 19/40 | (2006.01) |
| H02K 29/08 | (2006.01) |
| H02P 8/14 | (2006.01) |
| H02P 8/34 | (2006.01) |
| H02P 8/04 | (2006.01) |
| H02P 8/12 | (2006.01) |
| H02P 6/17 | (2016.01) |

(52) U.S. Cl.
CPC .................. *H02P 8/14* (2013.01); *H02P 6/17* (2016.02); *H02P 8/04* (2013.01); *H02P 8/12* (2013.01); *H02P 8/34* (2013.01)

(58) Field of Classification Search
CPC .......... H02P 6/16; H02P 6/26; H02P 2209/07; H02P 6/085; H02P 6/15; H02P 6/10; H02P 6/14; H02P 6/06; H02P 6/17; H02P 6/28; H02P 8/36; H02P 1/46; H02P 21/22; H02P 25/03; H02P 27/08
USPC ..... 318/685, 400.01, 400.04, 400.23, 400.38
See application file for complete search history.

(56) References Cited

U.S. PATENT DOCUMENTS

| 4,686,437 | A | * | 8/1987 | Langley | .............. H02P 23/0077 |
| | | | | | 318/400.01 |
| 4,764,714 | A | * | 8/1988 | Alley | ........................ H02P 1/44 |
| | | | | | 318/778 |
| 4,926,104 | A | * | 5/1990 | King | .................. H02M 7/53875 |
| | | | | | 318/599 |
| 4,926,105 | A | * | 5/1990 | Mischenko | ............. H02P 21/06 |
| | | | | | 318/800 |
| 5,031,087 | A | * | 7/1991 | Tuusa | .................... H02M 7/219 |
| | | | | | 363/127 |
| 5,352,962 | A | * | 10/1994 | Galburt | ..................... H02P 6/12 |
| | | | | | 318/135 |
| 5,449,986 | A | * | 9/1995 | Dozor | ....................... H02P 6/06 |
| | | | | | 318/400.04 |
| 5,532,583 | A | * | 7/1996 | Davis | ..................... G05B 19/21 |
| | | | | | 324/202 |

(Continued)

*Primary Examiner* — Paul Ip
(74) *Attorney, Agent, or Firm* — Muncy, Geissler, Olds & Lowe, P.C.

(57) ABSTRACT

A controller is provided for driving a stepper motor with a magnetic rotor and at least one coil. The controller has a power stage for supplying the at least one coil with current, at least one analog Hall sensor for providing a signal as a function of the position of the magnetic rotor with respect to the Hall sensor, and a feedback line connecting the Hall sensor with the power stage to feed the signal of the Hall sensor back to the power stage.

16 Claims, 3 Drawing Sheets

(56) References Cited

U.S. PATENT DOCUMENTS

| | | | |
|---|---|---|---|
| 5,552,682 A * | 9/1996 | Ushikoshi | H02P 6/16 318/400.04 |
| 5,559,419 A * | 9/1996 | Jansen | H02K 17/165 318/804 |
| 5,565,752 A * | 10/1996 | Jansen | H02K 17/165 310/169 |
| 5,585,703 A * | 12/1996 | Acquaviva | H02P 6/182 318/400.03 |
| 5,585,709 A * | 12/1996 | Jansen | H02K 17/165 318/720 |
| 5,627,710 A * | 5/1997 | Schoeffler | H02H 7/0851 361/23 |
| 5,650,779 A * | 7/1997 | Sugden | H02K 29/10 318/701 |
| 5,652,494 A * | 7/1997 | Sugden | H02P 25/0925 318/400.01 |
| 5,723,957 A * | 3/1998 | Ishikawa | H02P 6/06 318/400.11 |
| 5,747,952 A * | 5/1998 | Izawa | H02P 6/00 310/12.19 |
| 5,783,924 A * | 7/1998 | Kahlman | G11B 15/52 318/568.22 |
| 5,874,816 A * | 2/1999 | Ishii | E04G 21/122 140/57 |
| 5,880,586 A * | 3/1999 | Dukart | G01R 33/077 324/207.2 |
| 5,892,339 A * | 4/1999 | Park | H02P 6/16 318/400.38 |
| 5,952,809 A * | 9/1999 | Permuy | H02P 6/08 318/700 |
| 6,014,007 A * | 1/2000 | Seibel | H02P 21/34 318/798 |
| 6,049,182 A * | 4/2000 | Nakatani | H02P 6/10 318/254.2 |
| 6,184,639 B1 * | 2/2001 | Wallner | H02P 6/08 318/400.2 |
| 6,218,800 B1 * | 4/2001 | Akkermans | G05B 19/21 318/560 |
| 6,271,641 B1 | 8/2001 | Yasohara et al. | |
| 6,774,599 B2 * | 8/2004 | Ishii | G05B 19/02 318/652 |
| 6,794,777 B1 * | 9/2004 | Fradella | F16C 32/0457 310/68 B |
| 6,806,663 B2 * | 10/2004 | Kusaka | H02P 6/085 318/400.17 |
| 6,943,517 B2 * | 9/2005 | Yoshitomi | H02P 8/36 318/471 |
| 7,002,307 B2 * | 2/2006 | Yoshitomi | H02P 6/26 318/400.13 |
| 7,002,308 B2 * | 2/2006 | Kinukawa | H02P 6/16 318/400.04 |
| 7,002,318 B1 * | 2/2006 | Schulz | B60L 3/0038 318/437 |
| 7,009,351 B2 * | 3/2006 | Yoshitomi | H02P 6/26 318/400.29 |
| 7,026,779 B2 * | 4/2006 | Eba | G05B 19/19 318/560 |
| 7,148,643 B2 * | 12/2006 | Yoshitomi | H02P 8/36 318/471 |
| 7,154,238 B2 * | 12/2006 | Kinukawa | H02P 6/16 318/400.05 |
| 7,164,245 B1 * | 1/2007 | Chen | H02P 6/15 318/400.04 |
| 7,243,006 B2 * | 7/2007 | Richards | G06F 17/5036 318/801 |
| 7,265,509 B2 * | 9/2007 | Endo | B62D 5/0472 180/443 |
| 7,286,906 B2 * | 10/2007 | Richards | G06F 17/5036 700/286 |
| 7,294,988 B2 * | 11/2007 | Ajima | B60K 6/26 318/430 |
| 7,386,224 B2 * | 6/2008 | Hsieh | H02P 6/06 388/829 |
| 7,446,498 B2 * | 11/2008 | Cheng | H02P 6/15 318/400.38 |
| 7,671,585 B2 * | 3/2010 | Kitanaka | G01D 5/145 324/207.2 |
| 7,714,529 B2 * | 5/2010 | Chen | H02P 6/16 318/400.38 |
| 7,915,843 B2 * | 3/2011 | Mishima | H02P 6/16 318/400.04 |
| 8,093,846 B2 * | 1/2012 | Mishima | H02P 6/16 318/400.04 |
| 8,212,515 B2 * | 7/2012 | Hasegawa | G01D 5/2451 318/601 |
| 8,362,723 B2 * | 1/2013 | Kuwamura | H02P 6/085 318/400.04 |
| 8,378,598 B2 * | 2/2013 | Kaneko | H02P 21/06 318/114 |
| 8,405,329 B2 * | 3/2013 | Shimizu | H02P 6/16 318/400.01 |
| 8,456,118 B2 * | 6/2013 | Nakamura | H02P 6/15 318/400.01 |
| 9,083,273 B2 * | 7/2015 | Brannen | H02P 6/18 |
| 2003/0080772 A1 * | 5/2003 | Giacomini | B60R 16/0239 324/765.01 |
| 2003/0146727 A1 * | 8/2003 | Ishii | G05B 19/02 318/652 |
| 2003/0163296 A1 * | 8/2003 | Richards | G06F 17/5036 703/14 |
| 2004/0108827 A1 * | 6/2004 | Kusaka | H02P 6/085 318/400.2 |
| 2004/0135529 A1 * | 7/2004 | Yoshitomi | H02P 6/26 318/400.04 |
| 2005/0052147 A1 * | 3/2005 | Yoshitomi | H02P 8/36 318/471 |
| 2005/0067996 A1 * | 3/2005 | Eba | G05B 19/19 318/609 |
| 2005/0225273 A1 * | 10/2005 | Yoshitomi | H02P 6/26 318/400.3 |
| 2005/0248306 A1 * | 11/2005 | Chen | H02P 25/03 318/712 |
| 2005/0269965 A1 * | 12/2005 | Sato | H02M 3/1584 315/209 R |
| 2006/0012323 A1 * | 1/2006 | Endo | B62D 5/0472 318/432 |
| 2006/0038518 A1 * | 2/2006 | Kinukawa | H02P 6/16 318/400.21 |
| 2006/0125439 A1 * | 6/2006 | Ajima | B60K 6/26 318/716 |
| 2007/0021873 A1 * | 1/2007 | Richards | G06F 17/5036 700/286 |
| 2007/0047929 A1 * | 3/2007 | Hsieh | H02P 6/06 388/829 |
| 2007/0242043 A1 * | 10/2007 | Yang | G05G 9/047 345/161 |
| 2008/0012522 A1 * | 1/2008 | Wiegers | H02P 6/16 318/638 |
| 2008/0074071 A1 * | 3/2008 | Cheng | H02P 6/15 318/609 |
| 2009/0153084 A1 * | 6/2009 | Mishima | H02P 6/16 318/400.13 |
| 2010/0007294 A1 * | 1/2010 | Hasegawa | G01D 5/2451 318/400.04 |
| 2010/0117577 A1 * | 5/2010 | Yanagishima | H02P 29/032 318/432 |
| 2010/0194320 A1 * | 8/2010 | Kaneko | H02P 21/06 318/400.23 |
| 2010/0219781 A1 * | 9/2010 | Kuwamura | H02P 6/085 318/400.04 |
| 2010/0308760 A1 * | 12/2010 | Nakamura | H02P 6/15 318/400.11 |
| 2011/0018528 A1 * | 1/2011 | Semineth | G01D 5/2451 324/207.25 |
| 2011/0089874 A1 * | 4/2011 | Shimizu | H02P 6/16 318/400.04 |

(56) References Cited

U.S. PATENT DOCUMENTS

| | | | | |
|---|---|---|---|---|
| 2011/0139412 A1* | 6/2011 | Mishima | ............ | H02P 6/16 |
| | | | | 165/121 |
| 2011/0202308 A1* | 8/2011 | Kishida | ............ | G01B 7/30 |
| | | | | 702/151 |
| 2011/0234129 A1* | 9/2011 | Shimizu | ............ | H02P 6/085 |
| | | | | 318/400.04 |
| 2011/0246133 A1* | 10/2011 | Harada | ............ | G01D 5/145 |
| | | | | 702/151 |
| 2011/0279072 A1* | 11/2011 | Shimizu | ............ | H02P 6/16 |
| | | | | 318/400.04 |
| 2012/0217907 A1* | 8/2012 | Sakaguchi | ............ | H02P 6/21 |
| | | | | 318/400.1 |
| 2012/0262097 A1* | 10/2012 | Yamato | ............ | H02P 6/08 |
| | | | | 318/400.04 |
| 2012/0326643 A1* | 12/2012 | Brannen | ............ | H02P 6/18 |
| | | | | 318/400.11 |
| 2013/0009578 A1* | 1/2013 | Reynolds | ............ | H02P 6/14 |
| | | | | 318/400.14 |
| 2013/0099708 A1* | 4/2013 | Shimizu | ............ | H02P 21/146 |
| | | | | 318/400.39 |
| 2014/0347040 A1* | 11/2014 | Kawase | ............ | G01D 5/2448 |
| | | | | 324/207.12 |

* cited by examiner ated by the discrete stepping sequence. Known controllers which are designed for an open loop operation are simple and low cost. However, the stepper motor has to be over-dimensioned and over-powered to prevent any step loss. One consequence of the limited control (lacking knowledge of the actual motor dynamics) is a high level of torque pulsations which transform into noise. Furthermore, high input power results in high heat dissipation.

CONTROLLER FOR DRIVING A STEPPER MOTOR

CROSS REFERENCE TO RELATED APPLICATIONS

This non-provisional patent application claims priority under 35 U.S.C. §119(a) from Patent Application No. 1407953.7 filed in The United Kingdom on May 6, 2014, the entire contents of which are hereby incorporated by reference.

FIELD OF THE INVENTION

This invention relates to a motor controller and in particular, to a controller for driving a stepper motor.

BACKGROUND OF THE INVENTION

Stepper motors can be inherently noisy due to vibrations generated by the discrete stepping sequence. Known controllers which are designed for an open loop operation are simple and low cost. However, the stepper motor has to be over-dimensioned and over-powered to prevent any step loss. One consequence of the limited control (lacking knowledge of the actual motor dynamics) is a high level of torque pulsations which transform into noise. Furthermore, high input power results in high heat dissipation.

Other known controllers are based on a sensorless commutation, in which the drive lines are probed for the back electromotive force ("back-emf") and in which it is attempted to derive the rotor position and to adapt the commutation sequence accordingly. Such type of commutation is convenient because no external position sensing of the rotor is required. However, it's only stable within a limited range of operating conditions and it becomes critical at quickly varying loads (which arise for example for movements towards an end stop). Furthermore, such controllers require microprocessing for timing and generating sinusoidal current wave forms. Another problem is at motor standstill, where there is no back-emf; the position of the rotor is unknown and the starting procedure is performed essentially in an open loop mode.

In brushless DC motors digital Hall sensors for detection of the rotor position are used. The position information is discrete, not continuous. A decent amount of microprocessing and logic is required to approach a smoothly rotating magnetic field. However, digital electronics are prone to digital failure due to coding errors, ill-defined conditions, electromagnetic interference or high temperatures. Estimator algorithms are often unable to reliably predict position and speed at quickly varying conditions, i.e. motor blocking or spontaneous direction reversal. At low or zero speed the position and speed estimates become inaccurate.

Thus there is a need for a simplified controller which allows the driving of a stepper motor with reduced vibrations and in a reliable and robust manner, in particular when starting the stepper motor.

SUMMARY OF THE INVENTION

Accordingly, in one aspect thereof, the present invention provides a controller for driving a stepper motor with a magnetic rotor and at least one coil, the controller comprising: a power stage for supplying the at least one coil with current, at least one analog Hall sensor for providing a signal as a function of the position of the magnetic rotor with respect to the Hall sensor, and a feedback line connecting the Hall sensor with the power stage to feed the signal of the Hall sensor back to the power stage, which is configured to supply a current to the at least one coil as a function of the signal of the Hall sensor.

Preferably, the controller further comprises a closed loop with a speed control stage having an input connected to the Hall sensor and an output connected to the power stage, the control stage being configured to receive the signal of the Hall sensor and to produce a reference signal to be received by the power stage, the reference signal adjusting the amplitude of the signal of the Hall sensor provided via the feedback line.

Preferably, the speed control stage comprises another input for receiving an external signal defining a desired value for the rotational speed of the rotor.

Preferably, the input of the speed control stage is connected via a frequency-to-voltage converter with the Hall sensor.

Preferably, the at least one sensor is an analog Hall sensor which provides a substantially sinusoidal signal when the rotor is rotating and/or wherein the power stage is configured to produce a current to be supplied to the at least one coil which has a substantially sinusoidal wave form.

Preferably, there are at least two Hall sensors for providing two signals as a function of the position of the magnetic rotor with respect to the Hall sensors, the two signals being phase-shifted, preferably the phase shift being 90°.

Preferably, the two Hall sensors are arranged around the rotation axis of the rotor such that the angle between them is less than 60 degrees, preferably the Hall sensors are arranged on a plate, on which the power stage is arranged.

Preferably, the distance between the two Hall sensors is smaller than 4 mm, preferably smaller than 3 mm.

Preferably, the controller is designed as an ASIC.

According to a second aspect, the present invention provides a stepper motor incorporating the controller described above.

Preferably, the least one analog Hall sensor is arranged radially displaced with respect to the magnet of the rotor to measure a radial magnetic flux component, or is arranged axially displaced with respect to the magnet to measure an axial magnetic flux component.

Preferably, the rotor comprises a magnetic ring which extends laterally out of the stator.

Preferably, the controller is arranged on a plate, in particular a printed circuit board.

Preferably, the plate is firmly attached to a lateral extension of the coil body of the stepper motor, preferably the lateral extension being integrally formed with the portion of the coil body carrying the at least one coil.

Preferably, the at least two analog Hall sensors are arranged on the plate.

Preferably, the stepper motor has a rotor which is surrounded by at least two coils which are arranged axially offset along the rotation axis of the rotor.

Preferably, the rotor has a magnet, which is ring like and/or has at least 4 magnetic poles, preferably at least 6 magnetic poles and most preferably at least 8 magnetic poles.

According to a third aspect, the present invention provides a Actuator comprising a stepper motor according to any one of claims 10 to 17 and a gear drive.

According to a further aspect, the present invention provides a use of a controller, a stepper motor and/or an actuator as descried above, in a heating, ventilation and/or air conditioning system of a power-driven vehicle.

In the controller of the present invention, a closed loop circuit is provided by means of a feedback line, which connects the at least one analog Hall sensor with the power stage energizing the stepper motor. This design has the advantage that a feedback signal can be delivered to the power stage, which allows an improved movement of the stepper motor with respect to vibrations and consequently noise, efficiency and operation stability. As the energizing of the stepper motor can be optimized, an over-dimensioning is not necessary in order to prevent any step loss, i.e. the stepper motor according to the invention can be reduced with respect to power, dimensions, etc. compared to a stepper motor known in art used for the same applications. Furthermore, the controller can be designed such that a reliable and precise motion of the rotor is guaranteed, in particular when starting it from a rest position and/or moving it towards a rest position, which is e.g. defined by an end stop.

Preferably, there is further provided a closed loop with a speed control stage for producing a reference signal adjusting the amplitude of the signal of the Hall sensor. This allows the speed of the motor to be adjusted to a desired value. In addition, changes in the magnetic flux or coil resistance due to temperature changes may be compensated.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
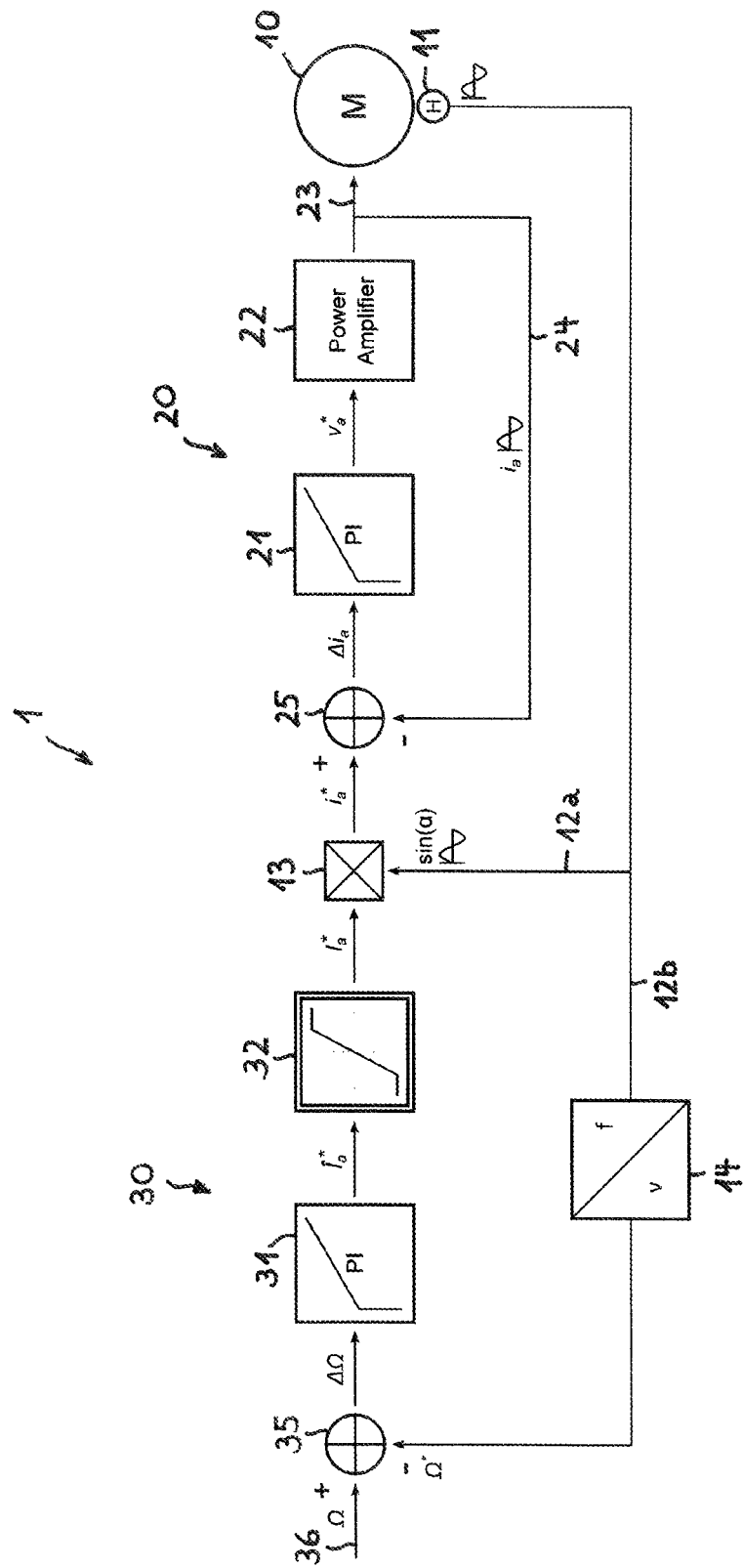
FIG. 1 is a schematic block diagram of an electronic circuit of a controller according to the preferred embodiment of the present invention.

FIG. 1 shows a schematic block diagram of the electronic circuit 1 of a controller for driving a stepper motor, such that the direction of rotation and the speed can be predetermined. The stepper motor includes a rotor with a magnet 10 having a multitude of magnetic poles. Typically, at least 4 poles are provided, whereas preferably there are 10 poles or more. The electric circuit comprises a Hall sensor 11, preferably in the form of an analog Hall sensor. An analog Hall sensor is a transducer whose output signal varies in response to the magnetic field sensed and, being an analog element, it directly gives a voltage as an output signal. The Hall sensor 11 allows to measure the angular position of the magnet 10 (in electric units) in a contactless manner.

The electronic circuit 1 is formed as a closed-loop circuit. In particular, the circuit 1 comprises a first feedback line 12a connecting the sensor 11 to the input of the power stage 20 via a component for adjusting the gain, which includes e.g. a multiplier 13.

The power stage 20 is e.g. formed as a voltage controlled current source with a current feedback loop 24. It comprises filter means 21, which may include a proportional-integral controller ("PI-controller"), and a power amplifier 22, which includes an output 23 for connection to the coil(s) of the motor and a feedback line 24 to feed the output signal of the power amplifier 22 back to the input of the power stage 20. The input comprises a comparator 25 which receives the signal from the multiplier 13 and from the output of the power stage 20.

The power amplifier 22 is e.g. configured to be operated on the basis of a pulse with modulation (PWM) to control the amount of power delivered to the load, i.e. coil(s). The power is controlled by switching the supply on and off at high frequency. The average voltage and therefore power delivered to the load is modulated with the duty-cycle (ON time per switching period).

The circuit 1 further comprises a second feedback loop. In particular, there is a feedback line 12b connecting the sensor 11 to the input of a speed control stage 30. In the second feedback line 12b there is incorporated a frequency-to-voltage converter 14. The speed control stage 30 comprises an input 36 for receiving an external signal, a comparator 35, a PI-controller 31 and a limiter 32, which is connected to the multiplier 13. The components 31, 32 are regulation components defining the dynamic response of the second feedback loop.

The external signal 36 defines the desired value for the speed of the rotor and may be e.g. triggered by a user. The signal is e.g. a constant value or may vary with time, depending on the requirements of the application.

In operation, the analog Hall sensor 11 produces a voltage signal as a function of the magnet's polarization pattern and position. For a laterally magnetized multipolar ring magnet the signal is sinusoidal with the shape corresponding to the back electromotive force ("back-emf"), i.e. the voltage induced by the rotating magnet 10 in the coil. The phase shift between the Hall voltage signal and the back-emf is constant and is preferably minimized by appropriate angular positioning of the analog Hall sensor 11. However, in contrast to the back-emf, the amplitude of the signal provided by the sensor 11 is independent of the rotor's speed. Therefore, instantaneous rotor angular position is known at any time, also at standstill.

The voltage signal of the sensor 11 is fed via the multiplier 13 to the power stage 20 and corresponds substantially to the very signal which is required to define the shape and the phase of the current signal for driving the motor.

Information on the actual rotor's speed is e.g. obtained by evaluating the times between the zero crossings of the Hall sensor's signal, which yields a frequency. This frequency is converted to a voltage (denoted by $\Omega^*$ in FIG. 1) by means of the frequency-to-voltage converter 14. This voltage $\Omega^*$, which corresponds to the actual value of the rotor's speed, is compared with the input reference voltage (denoted by Ω in FIG. 1), which sets the desired speed, in order to produce an output signal ΔΩ, which is further processed by the components 31, 32 to give a speed signal I*a.

Preferably, the speed control stage 30 is configured to form a loop which adjusts or limits the injected power (i.e. current) just to the level required to keep the speed. The signal ΔΩ defines the peak amplitude of the current for energizing the coil.

The speed signal I*a is the gain factor fed into the multiplier 13 in order to adjust the amplitude of the Hall sensor's signal denoted by i*a in FIG. 1. In the power stage 20, comparator 25 compares this signal i*a with the actual current is in the feedback line 24 to produce a comparative value Δia which is accordingly filtered and amplified by components 21, 22 to produce the current signal for energizing the motor.

In general terms, the signal of the Hall sensor 1 delivered via the feedback line 12a defines the shape and phase of the current signal at the output 23, whereas the amplitude of the current signal is determined by the speed feedback loop formed by the control speed stage 30.

Depending on the design of the stepper motor, multiple current signals are required to drive the rotor. For a two phase stepper motor, a rotating magnetic field generated by two phases with 90° phase shift is needed, i.e. sin(a(t)) and sin(a(t)±pi/2)=cos(a(t)). The signals are delivered by two sensors each being of the form of an analog Hall sensor 11 and having its own power stage 20 and speed control stage 30 of FIG. 1.

In general, the use of two Hall sensors 11 makes instantaneous information of the absolute position of the magnet 10 available. As a result, the electronic circuit 1 can appropriately react upon dynamic changes of load torque. The status and position of the rotor are always known. It is possible to provide for an almost perfect sinusoidal commutation current, which guarantees a very smooth torque transmission. The closed-loop circuit formed by feedback line 12a allows the power injected into the motor to be adjusted to the minimum required just to maintain the speed at given load torque. Therefore, the torque pulsations as well as the noise are suppressed to a minimum.

Figure 2:
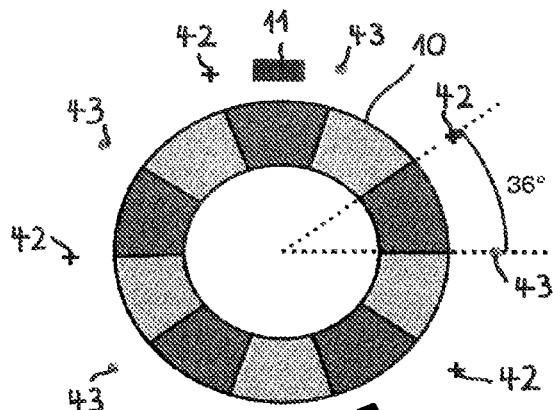
FIG. 2 is a schematic view of a rotor magnet with a first Hall sensor and possible positions for a second Hall sensor.
Figure 3:
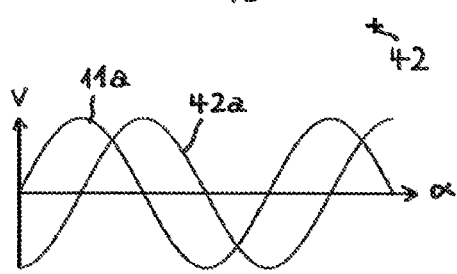
FIG. 3 shows signals produced by two Hall sensors, wherein the second Hall sensor is arranged at one of the positions 42 in FIG. 2.
Figure 4:
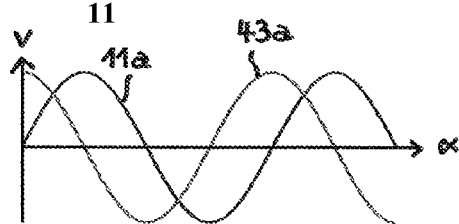
FIG. 4 shows signals produced by two Hall sensors, wherein the second Hall sensor is arranged at one of the positions 43 in FIG. 2.

In order to produce the desired phase shift, the analog Hall sensors 11 are to be properly positioned. FIG. 2 shows the multipolar magnet 10 and the location of the first Hall sensor 11. This sensor 11 measures the radial magnetic flux and produces an output signal as shown by curve 11a in FIGS. 3 and 4, wherein the x-coordinate is the rotation angle α and the y-coordinate is the voltage level V. The crosses 42 and the dots 43 in FIG. 2 define the possible positions of the second Hall sensor in order to get two sinusoidal signals shifted in phase by 90° as shown in FIGS. 3 and 4. Curve 42a in FIG. 3 is the corresponding signal of a Hall sensor located at a cross 42 and curve 43a in FIG. 4 is the corresponding signal of a Hall sensor located at a dot 43. The angle between two neighbouring positions 42 and 43 is given by 360°/NP, where NP is the number of magnetic poles. (In the example of FIG. 2, NP is equal to 10, resulting in an angle of 36°). Basically, the two Hall sensors are arranged apart at a distance s*(n−½), where s is the pole spacing and n=1, 3, 5, . . . . Alternatively, an arrangement with n=0, 2, 4, . . . also satisfies the requirement of a 90° phase difference, but with one signal having reversed polarity. Preferably, the two Hall sensors are arranged adjacent to each other, in order to mount them on the same plate or integrate them in the same chip. In this case, the angle between the Hall sensors is chosen to be less than 60 degrees, more preferably less than 45 degrees. The distance between the Hall sensors may be in the range from 1 mm to 4 mm.

Instead of using two Hall sensors it is also possible to use only one sensor. In this embodiment, the second signal is derived from the first signal provided by the Hall sensor e.g. by differentiation. In this case, the magnet 10 of the rotor is required to move in order to differentiate the Hall sensor's 11 signal. A driver solution based on a single Hall sensor is advantageous due to reduced number of circuit components. In order to resolve the ambiguity of angular position at low or zero speed, estimator methods may be applied.

Figure 5:
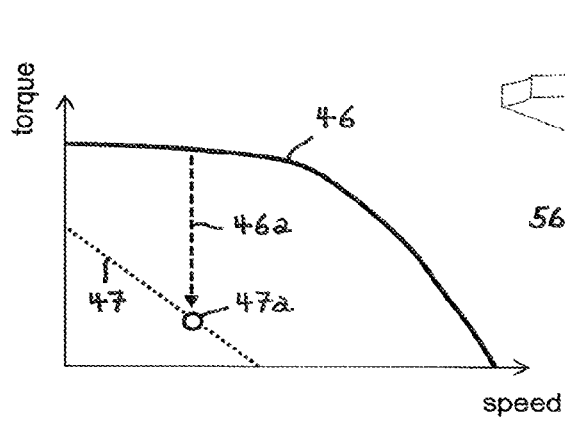
FIG. 5 shows a graph of the torque as a function of the speed for a conventional motor and a motor designed for the same application, but including a controller according to the invention.

The controller according to the invention has, among others, the advantage that the current excitation and power efficiency of the stepper motor can be optimized, while a reliable and precise motion of the rotor is guaranteed, in particular the risk of step-loss is reduced or even eliminated. Thus, a reliable operation for a particular given application, e.g. the pivoting of a component in a car, can be guaranteed with a less powerful stepper motor. This is shown in the diagram of FIG. 5, where the x-coordinate is the speed of the rotor and the y-coordinate the torque. When using a conventional stepper motor, it usually has an overpowered design in order to achieve a reliable operation within a certain environment. (In cars, for instance, the battery voltage and the ambient temperature may vary in the ranges 8V to 16V and −40° C. to +155° C., respectively.) Curve 46 in FIG. 5 schematically shows the pullout torque of a conventional stepper motor driven in open-loop mode as a function of the speed. However, the actual operating point of a stepper motor at nominal speed is always well below that curve 46 in order to guarantee synchronicity, as indicated by point 47a. By reducing the motor output torque to the minimum level required to move the load at specified speed, as indicated by the arrow 46a, we actually reduce the current for energizing the coil(s), the power in the system as well as torque related vibrations and noise, as compared to the conventional stepper motor operation. Line 47 shows a typical load line of a DC motor for reference.

Figure 6:
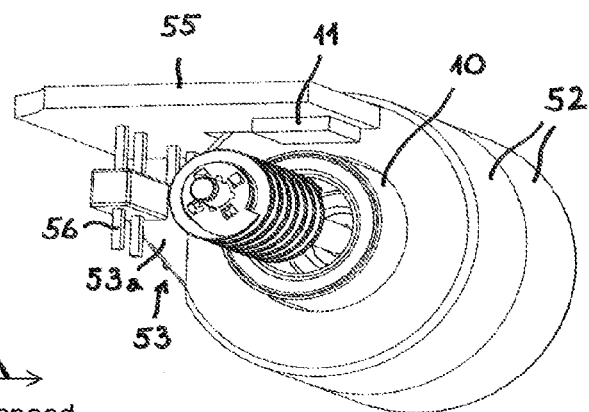
FIG. 6 is a perspective view of a stepper motor including a controller according to the invention.

FIG. 6 shows a stepper motor with a rotor which comprises a multipolar magnet 10 in form of a ring and an output shaft with a worm gear 51 for being coupled to the gear drive. The stator of the stepper motor comprises stator portions 52 with pole teeth surrounding the rotor, at least one coil (not visible in FIG. 6) for magnetizing the pole teeth and a coil body 53. The stepper motor is e.g. designed as a tin-can (or claw pole) motor and has for instance two coils, which are arranged coaxially along the rotation direction.

The magnet 10 extends laterally out of the stator 52 in order to be accessible for one or more Hall sensors 11 to measure the radial flux component at the magnet's outer circumference.

The stepper motor further comprises a plate 55 on which an ASIC ("application-specific integrated circuit") comprising the electronic circuit 1 of FIG. 1 is arranged. Preferably, this ASIC is designed such that the Hall sensor(s) 11 is/are integrated. Pins 56 are extending from the plate 55 for connection to a cable. In the embodiment of FIG. 6, the coil body 53 has an arm portion 53a which is integrally formed with the portion of the coil body 53 carrying the coil(s) and which extends laterally out of the stator 52. The plate 55 with the pins 56 is fixed to the arm portion 53a, thereby providing a rigid arrangement of the Hall sensor(s) 11 with respect to the magnet 10, so that a precise measurement of its position is enabled.

Figure 7:
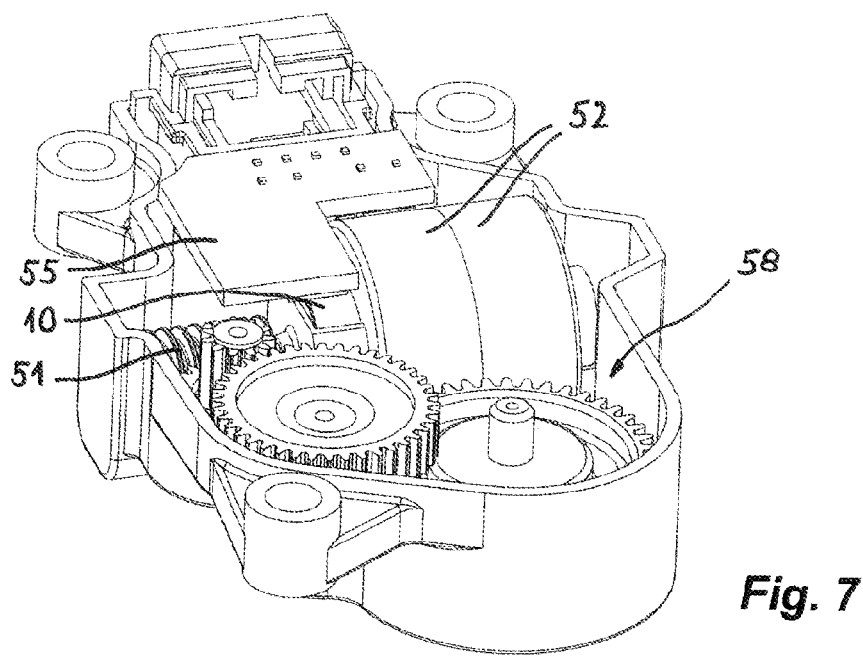
FIG. 7 is a perspective view of an actuator including a stepper motor according to FIG. 5.

FIG. 7 shows an actuator having the stepper motor of FIG. 6, where the cover of the housing is not shown. The worm gear 51 is coupled to the gear drive 58, whose output shaft can be coupled to the component to be moved by the actuator.

The actuator can be used for instance in a power-driven vehicle, in particular in the heating, ventilation and/or air conditioning system. Such systems include one or more flaps which are to be adjusted by an actuator. The housing of such systems may behave similar to a sound box or a resonator. Thus, actuators with a particularly low excitation level are preferred because any vibrations transmitted can be transformed to noise and amplified by the housing.

Figure 8:
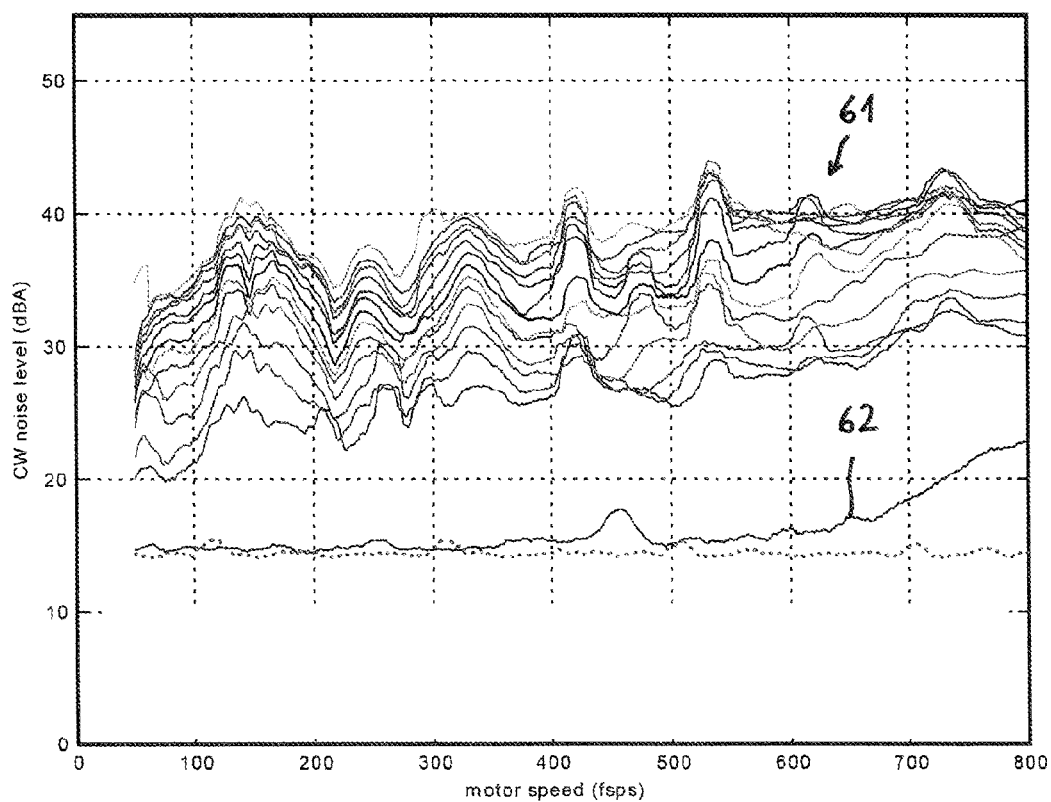
FIG. 8 shows a comparison of measured noise levels when driving the motor with a standard controller and with a controller according to the invention.

FIG. 8 shows results from noise measurements for an actuator, whose stepper motor is driven in different ways. The x-coordinate gives the speed of the rotor, here in units of fsps ("full steps per second"); the y-coordinate is the noise level, here in units of dbA (A-weighted decibels). Curves 61 give the noise produced when driving the stepper motor with a standard 1/16 microstepping driver at different current levels. The curve 62 corresponds to the noise produced when driving the stepper motor by an analog Hall sensor feedback according to the invention. As can be seen curve 62 gives a noise level, which, for each rotor speed measured, is drastically reduced with respect to the conventional way of driving.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, the circuit of the controller may be designed such that some or all of the signals provided by the at least one Hall sensor are digitized. For instance the feedback line 12a in FIG. 1 may comprise an analog-to-digital converter for converting the signal, which the at least one Hall sensor provides in an analog, i.e. continuous form, into a digital signal, which is non-continuous. This digital signal is fed to the power stage 20 and to the speed control stage 30, where the operations of some or all blocks in the loops 20 and/or 30 are performed digitally.

The invention claimed is:

1. A controller for driving a stepper motor with a magnetic rotor and at least one coil, the controller comprising:
    a power stage for supplying the at least one coil with current, the power stage having an input including a comparator, a filter means connected to the comparator, a power amplifier connected to the filter means and an output connected to the power amplifier and configured for connection with the at least one coil, the power stage having a current feedback loop connecting the output of said power stage to an input of said comparator to feed an output signal at the output of the power stage back to the input,
    at least one analog Hall sensor mounted near the magnetic rotor and magnetically sensing a position of the magnetic rotor with respect to the Hall sensor and providing an output signal at an output, and
    a feedback line connecting the output of the Hall sensor with a multiplier whose output is connected to the input of the comparator to feed the output signal of the Hall sensor back to the power stage, which is configured to supply a current to the at least one coil as a function of the signal of the Hall sensor,
    wherein the comparator receives the signal from the multiplier and the signal from the output of the power stage;
    wherein the at least one analog Hall sensor provides a substantially sinusoidal signal when the rotor is rotating.

2. The controller of claim 1, further comprising a closed loop forming a speed control stage, the closed loop having an input connected to the output of the Hall sensor and an output connected to the input of the multiplier, the speed control stage producing a reference signal to be received by the multiplier, the reference signal adjusting the amplitude of the output signal of the Hall sensor in the multiplier.

3. The controller of claim 2, wherein the speed control stage comprises another input for receiving an external signal defining a desired value for the rotational speed of the rotor and a second comparator for comparing the desired value and an actual value received from the output signal of the Hall sensor.

4. The controller of claim 2, wherein the input of the closed loop is connected via a frequency-to-voltage converter to a second comparator.

5. The controller of claim 1, comprising at least two Hall sensors for providing two signals as a function of the position of the magnetic rotor with respect to the Hall sensors, the two signals being phase-shifted.

6. The controller of claim 5, wherein the phase shift is 90°.

7. The controller of claim 5, wherein the two Hall sensors are arranged around the rotation axis of the rotor such that the angle between them is less than 60 degrees.

8. The controller of claim 5, wherein the Hall sensors are arranged on a plate, on which the power stage is arranged.

9. The controller of claim 5, wherein the distance between the two Hall sensors is less than 3 mm.

10. A stepper motor comprising the controller of claim 1, wherein the output of the controller is connected to at least one coil of the stepper motor.

11. The stepper motor of claim 10, comprising a rotor having a magnetic ring which extends laterally out of the stator.

12. The stepper motor of claim 10, wherein the controller is arranged on a printed circuit board, which is firmly attached to a lateral extension of a coil body carrying the at least one coil.

13. The stepper motor of claim 10, wherein the controller is arranged on a printed circuit board, the at least two analog Hall sensors are arranged on the printed circuit board.

14. The stepper motor of claim 10, comprising a rotor, which is surrounded by at least two coils, which are arranged axially offset along the rotation axis of the rotor.

15. The stepper motor of claim 14, wherein the rotor has a magnet with at least 4 magnetic poles.

16. An actuator for a component comprising a stepper motor comprising the controller of claim 1 and a rotor having an output shaft, and
    a gear drive connected between the output shaft of the rotor and the component so that rotation of the rotor causes the actuation of the component.

* * * * *